(12) United States Patent
Donovan et al.

(10) Patent No.: US 6,817,643 B2
(45) Date of Patent: Nov. 16, 2004

(54) VEHICLE CONSOLE ASSEMBLY

(75) Inventors: Jeffrey M. Donovan, St. Clair Shores, MI (US); Toshio Totsuka, Ann Arbor, MI (US); Jody K. Harwood, Canton, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/388,343

(22) Filed: Mar. 13, 2003

(65) Prior Publication Data

US 2003/0184108 A1 Oct. 2, 2003

Related U.S. Application Data

(60) Provisional application No. 60/368,364, filed on Mar. 28, 2002.

(51) Int. Cl.[7] ............................................... B60R 27/00
(52) U.S. Cl. .................................. 296/24.34; 296/37.7
(58) Field of Search ........................... 296/24.34, 37.1, 296/37.7, 37.8, 37.12, 70, 1.07, 24.3, 214

(56) References Cited

U.S. PATENT DOCUMENTS

| 4,505,054 A | 3/1985 | Clark et al. |
|---|---|---|
| 4,546,551 A | 10/1985 | Franks |
| 4,953,305 A | 9/1990 | Van Lente et al. |
| 5,229,923 A | 7/1993 | Long et al. |
| 5,266,052 A | 11/1993 | Phillips, II |
| 5,822,023 A | 10/1998 | Suman et al. |
| 6,166,450 A * | 12/2000 | Watanabe et al. .......... 307/10.1 |
| 6,192,315 B1 | 2/2001 | Geschke et al. |
| 6,273,499 B1 * | 8/2001 | Guyon ....................... 296/214 |
| 6,388,881 B2 * | 5/2002 | Yamauchi et al. ............ 296/70 |
| 2003/0138733 A1 * | 7/2003 | Sachdev et al. ............ 430/311 |

* cited by examiner

Primary Examiner—Jason Morrow
(74) Attorney, Agent, or Firm—Bill C. Panagos

(57) ABSTRACT

A console assembly for use with a vehicle includes a console housing adapted to be attached to the vehicle and having an aperture. An electronic module is attached to the console housing and includes a circuit board and a face plate having an integral fastening element that secures the circuit board to the face plate. The face plate further has an appearance surface and is positioned proximate the aperture of the console housing such that the appearance surface is viewable from an interior passenger compartment of the vehicle when the console assembly is installed in the vehicle.

22 Claims, 4 Drawing Sheets

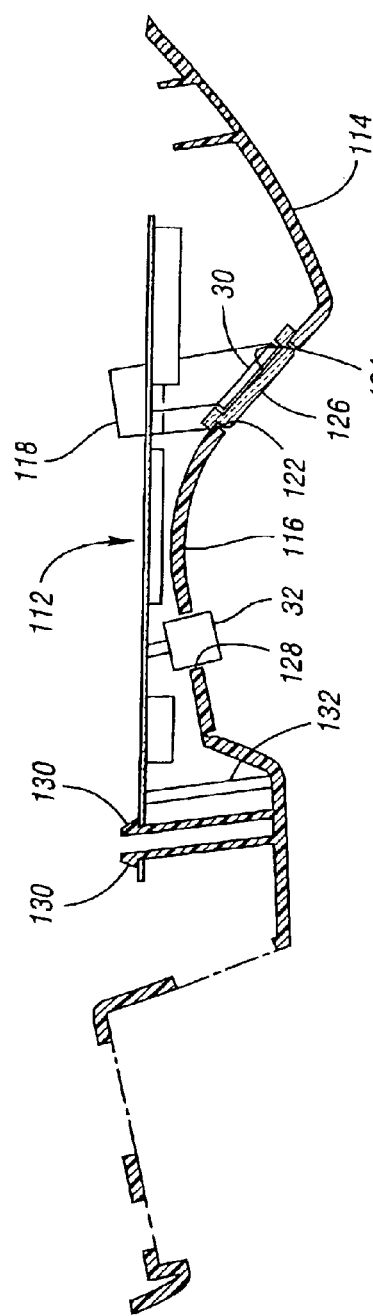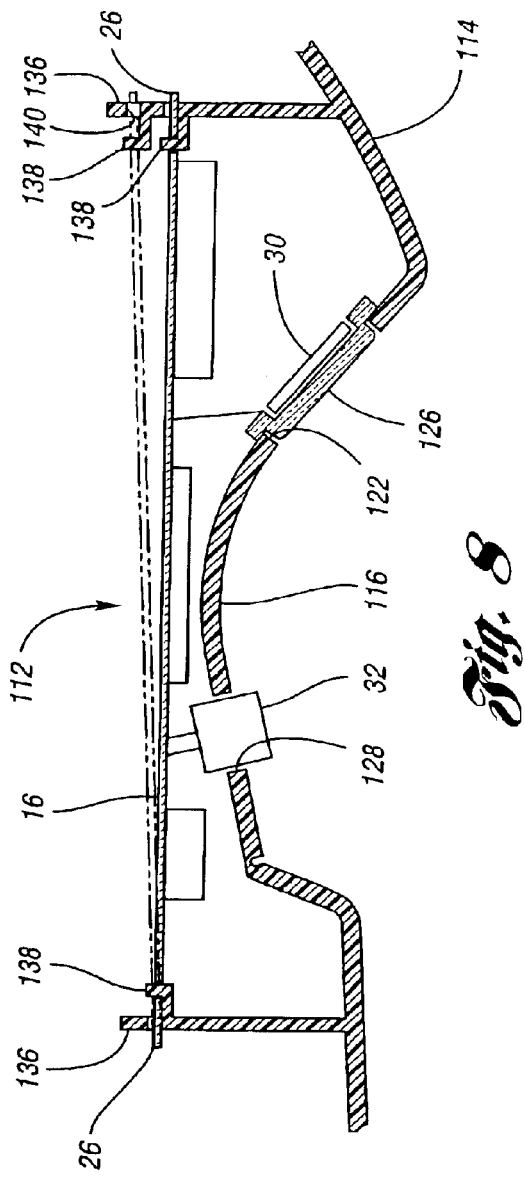

VEHICLE CONSOLE ASSEMBLY

This application claims the benefit of Provisional Application No. 60/368,364, field Mar. 28, 2002.

BACKGROUND OF THE INVENTION

1. Field of the Invention

The present invention relates to a console assembly for use with a vehicle.

2. Background Art

Many vehicles are being equipped with electronic devices such as compasses and/or trip computers. These electronic devices may include a printed circuit board (PCB), a display unit and user controls, such as buttons.

One known system for mounting such a device is disclosed in U.S. Pat. No. 4,505,054. That system includes a two-piece snap lock housing that encloses a PCB. The system further includes separate fasteners that are used to mount the housing to a bracket, which, in turn, is secured to the roof of a vehicle.

SUMMARY OF THE INVENTION

Under the invention, a console assembly is provided for use with a vehicle. The console assembly includes a console housing adapted to be attached to the vehicle and having an aperture. An electronic module is attached to the console housing and includes a circuit board and a face plate having an integral fastening element that secures the circuit board to the face plate. The face plate further has an appearance surface and is positioned proximate the aperture of the console housing such that the appearance surface is viewable from an interior passenger compartment of the vehicle when the console assembly is installed in the vehicle.

Further under the invention, a console assembly for use with a vehicle includes a console housing that is attachable to the vehicle such that at least a portion of the console housing is viewable from an interior passenger compartment of the vehicle. Moreover, the console housing has an integral fastening element. The console assembly further includes an electronic module having a circuit board attached to the fastening element of the console housing.

BRIEF DESCRIPTION OF THE DRAWINGS

FIG. 7 shows an alternative mounting scheme for mounting the electronic module of the second embodiment to the console housing; and FIG. 8 shows another alternative mounting scheme for mounting the electronic module of the second embodiment to the console housing.

DETAILED DESCRIPTION OF THE PREFERRED EMBODIMENTS

Figure 1:
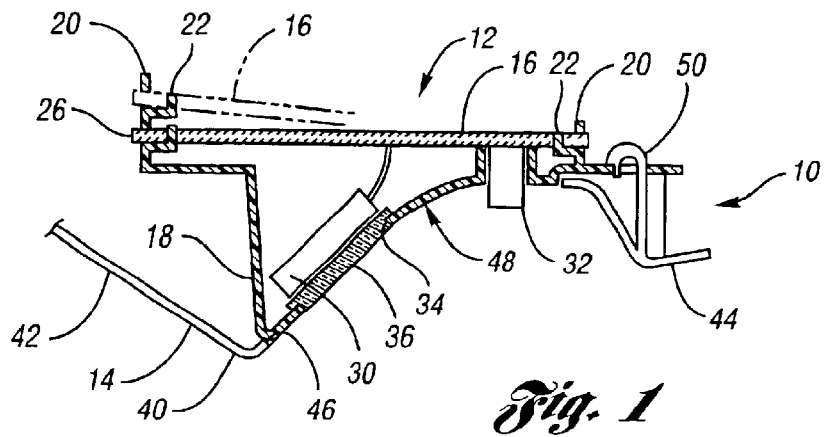
FIG. 1 is a cross-sectional view of a console assembly according to the invention for use with a motor vehicle, wherein the console assembly includes an electronic module attached to a console housing.
Figure 2:
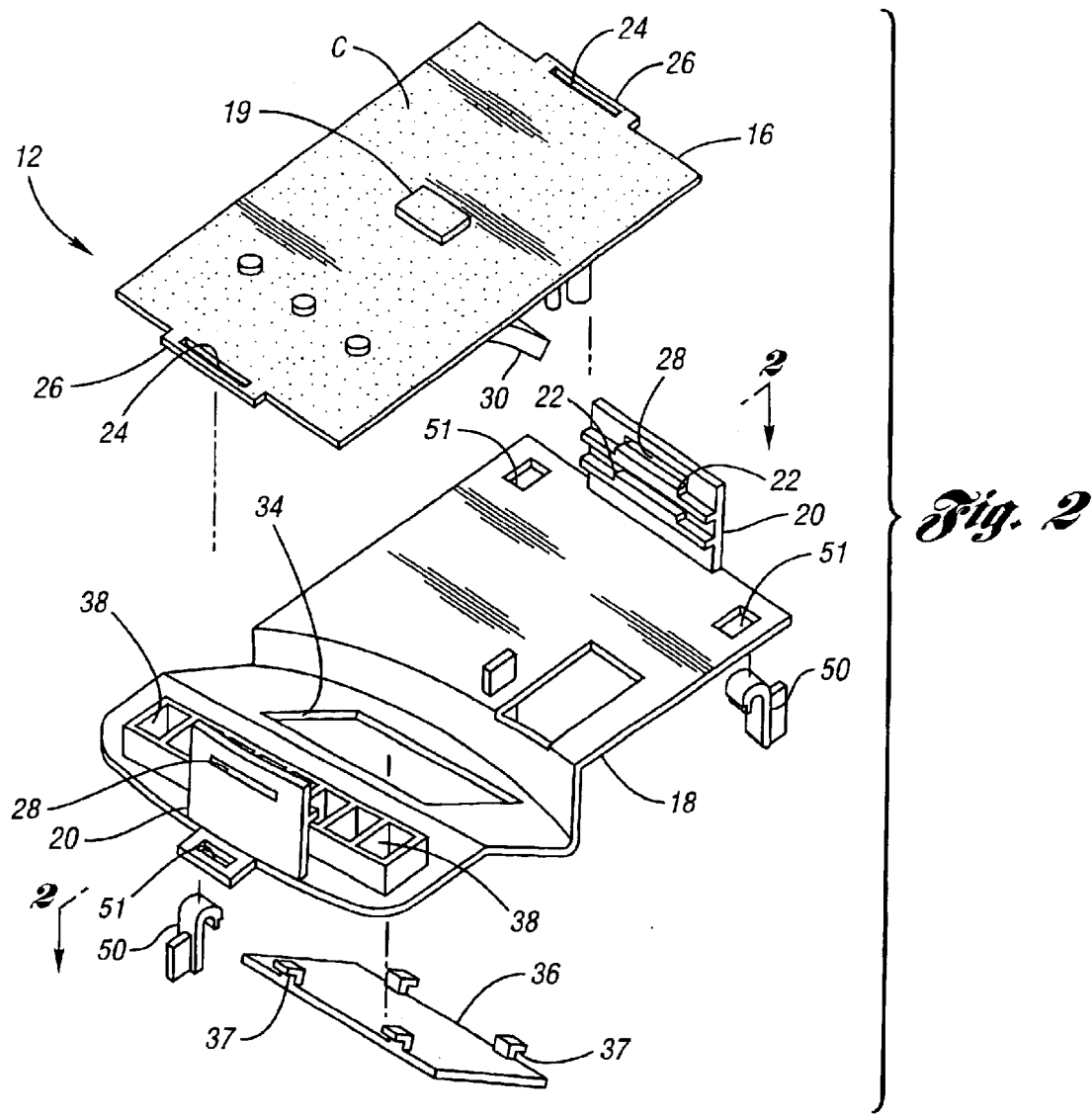
FIG. 2 is an exploded perspective view of the electronic module.

FIG. 1 shows a console assembly 10 that is attachable to a vehicle roof system (i.e., vehicle headliner and/or vehicle roof) of a motor vehicle (not shown). The assembly 10 includes an electronic module, such as a compass module or a compass and mini trip computer (CMTC) module 12, connected to an overhead console 14. Referring to FIGS. 1 and 2, the CMTC module 12 includes a circuit board, such as a CMTC printed circuit board (PCB) 16, and a support element, such as a face plate 18, connected to the PCB 16.

The PCB 16 may include a compass sensor, such as a magnetic field sensor 19, for sensing orientation of the vehicle. The PCB 16 may also be configured to communicate with a vehicle computer system to obtain information from the computer system. For example, the PCB 16 may be configured to be electrically connected to a vehicle computer system and communicate via bus protocol to obtain vehicle operating information and/or conditions.

In the embodiment shown in FIGS. 1 and 2, the face plate 18 includes one or more integral fastening elements 20 that are engageable with the PCB 16 to secure the PCB 16 to the face plate 18. The fastening elements 20 may be flexible to allow the PCB 16 to snap into engagement with the face plate 18. Each fastening element 20 may also include one or more projections 22 that are each insertable into a corresponding opening, such as hole 24, in the PCB 16. Alternatively or supplementally, the PCB 16 may include one or more projections 26 that are each insertable into a corresponding aperture 28 in a respective fastening element 20.

Furthermore, the fastening elements 20 may be configured to allow two or more different installation positions or orientations for the PCB 16. In the embodiment shown in FIG. 1, for example, the forward most fastening element 20 has two projections 22 that enable the PCB 16 to be installed in a first or lower position, shown in solid lines, and a second or upper position, shown partially in phantom lines, in which the front end of the PCB 16 is rotated upwardly with respect to the lower position. With such an arrangement, a desired angular orientation for the PCB 16 may be achieved when the console assembly 10 is mounted to any one of two or more different vehicle roof system configurations. For example, the PCB 16 may be mounted substantially flat, i.e., within plus or minus 10 degrees from a horizontal plane, when the console assembly 10 is mounted to any one of two or more different vehicle roof system configurations.

As yet another alternative, the PCB 16 may be connected to the face plate 18 in any suitable manner. For example, the PCB 16 may be connected to the face plate 18 with adhesive, screws, and/or other fastening elements.

The CMTC module 12 further includes a display unit or device 30 connected to the PCB 16, and one or more control buttons 32 movably connected to the PCB 16 for activating switches (not shown) on the PCB 16. The display device 30 is in electrical communication with the PCB 16, and is operable to display various functions or features provided by the PCB 16. For example, the display device 30 may display compass readings, mileage, trip functions, vehicle operating conditions, etc.

When the PCB 16 is connected to the face plate 18, the display device 30 is positioned adjacent a viewing aperture 34 formed in the face plate 18. The CMTC module 12 may also include a transparent cover 36 that is snap fit, or otherwise positioned, in the viewing aperture 34. The cover 36 may also include one or more positioning elements for positioning the display device 30 with respect to the cover 36. In the embodiment shown in FIG. 2, for example, the cover 36 includes multiple flexible clips 37 that secure the cover 36 to the face plate 18, and that also secure the display device 30 to the cover 36.

The control buttons 32 extend through button openings 38 formed in the face plate 18, and the control buttons 32 are used to control the various features of the PCB 16. For example, the control buttons 32 may be used to toggle between compass reading, mileage and trip functions. Furthermore, the control buttons 32 may be made of any suitable material, such as elastomeric material.

Referring to FIG. 1, the console 14 includes a console housing, such as a frame or bezel 40, that is attachable to a vehicle headliner (not shown) and/or vehicle roof (not shown), such that the bezel 40 is positionable generally adjacent the vehicle roof proximate a front windshield (not shown) of the vehicle. The bezel 40 may be attached to the headliner and/or roof in any suitable manner, such as by a snap fit and/or with screws or other fastening elements.

The bezel 40 includes a forward portion 42 that is disposable toward the front of the vehicle, and a rearward portion 44 that is disposable toward the rear of the vehicle. The bezel 40 also includes an opening 46 for receiving the face plate 18, such that an appearance surface or decorative surface 48 of the face plate 18 is viewable from an interior passenger compartment of the vehicle. Furthermore, the bezel 40 may be provided with one or more integral fastening elements 50, such as clips, that are engageable with the face plate 18 to secure the CMTC module 12 to the bezel 40. For example, each fastening element 50 may be insertable through a corresponding aperture 51 formed in the face plate 18. In the embodiment shown in FIGS. 1 and 2, each fastening element 50 has a flexible tip that forms an interference fit with the face plate 18 when the fastening element 50 is inserted into the corresponding aperture 51. Alternatively, the face plate 18 may be attached to the bezel 40 in any suitable manner, such as with screws or other fastening elements.

With the configuration described above, a separate enclosure or casing for the PCB 16 is not required. In the embodiment shown in FIGS. 1 and 2, for example, the PCB 16 is exposed directly to the vehicle headliner or vehicle roof when the console assembly 10 is installed in the vehicle. Because a separate enclosure is not required, this configuration allows for design flexibility in the PCB 16, and a reduction in manufacturing costs.

A coating C may be applied to the PCB 16, however, to protect the PCT from the environment. For example, the PCB 16 may be dipped in or sprayed with epoxy. Such a coating may be considered part of the PCB 16, and may be applied over the entire body of the PCB 16, or select portions of the PCB body.

The face plate 18 and the bezel 40 may be made in any suitable manner and may comprise any suitable material or materials. For example, the face plate 18 and the bezel 40 may be made of thermoplastic or thermoset material that is compression molded or injection molded in a suitable mold.

Figure 3:
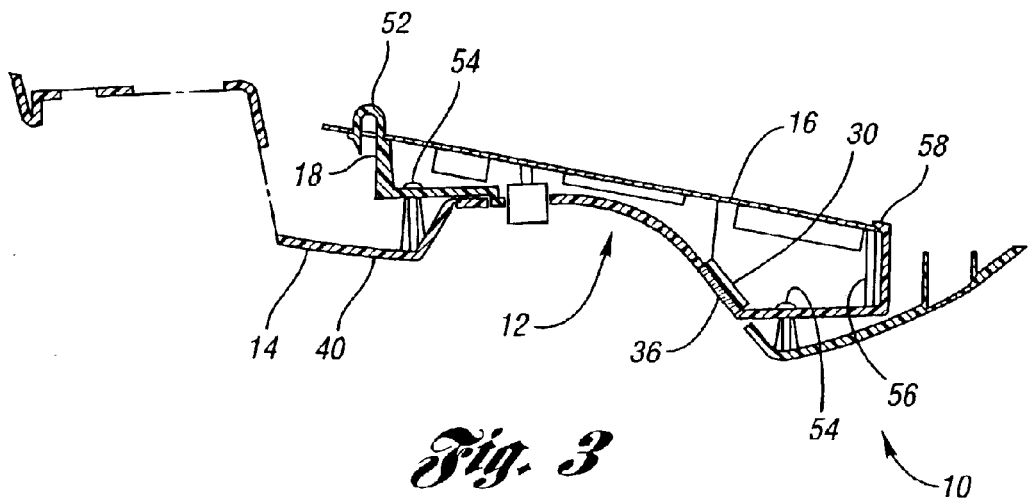
FIG. 3 shows an alternative mounting scheme for attaching the electronic module to the console housing.

FIG. 3 shows an alternative mounting arrangement or scheme for attaching the PCB 16 to the face plate 18, as well as an alternate mounting scheme for attaching the CMTC module 12 to the bezel 40. More specifically, the face plate 18 shown in FIG. 3 includes one or more integral fastening elements, such as flexible clips 52, for securing the PCB 16 to the face plate 18. In addition, the CMTC module 12 is connected to the bezel 40 with fastening elements, such as screws 54.

Still referring to FIG. 3, the CMTC module 12 may also include one or more positioning elements such as pins 56 for positioning the PCB 16 with respect to the face plate 18. For example, the positioning pins 56 may be attached to the face plate 18 and may be configured to support the PCB 16 against a projection 58 of the face plate 18. More specifically, one or more of the positioning pins 56 and the projection 58 may cooperate to define a gap for receiving the PCB 16. With such a configuration, one or more of the positioning pins 56 and the projection 58 cooperate to form an additional fastening element for securing the PCB 16 to the face plate 18.

Figure 4:
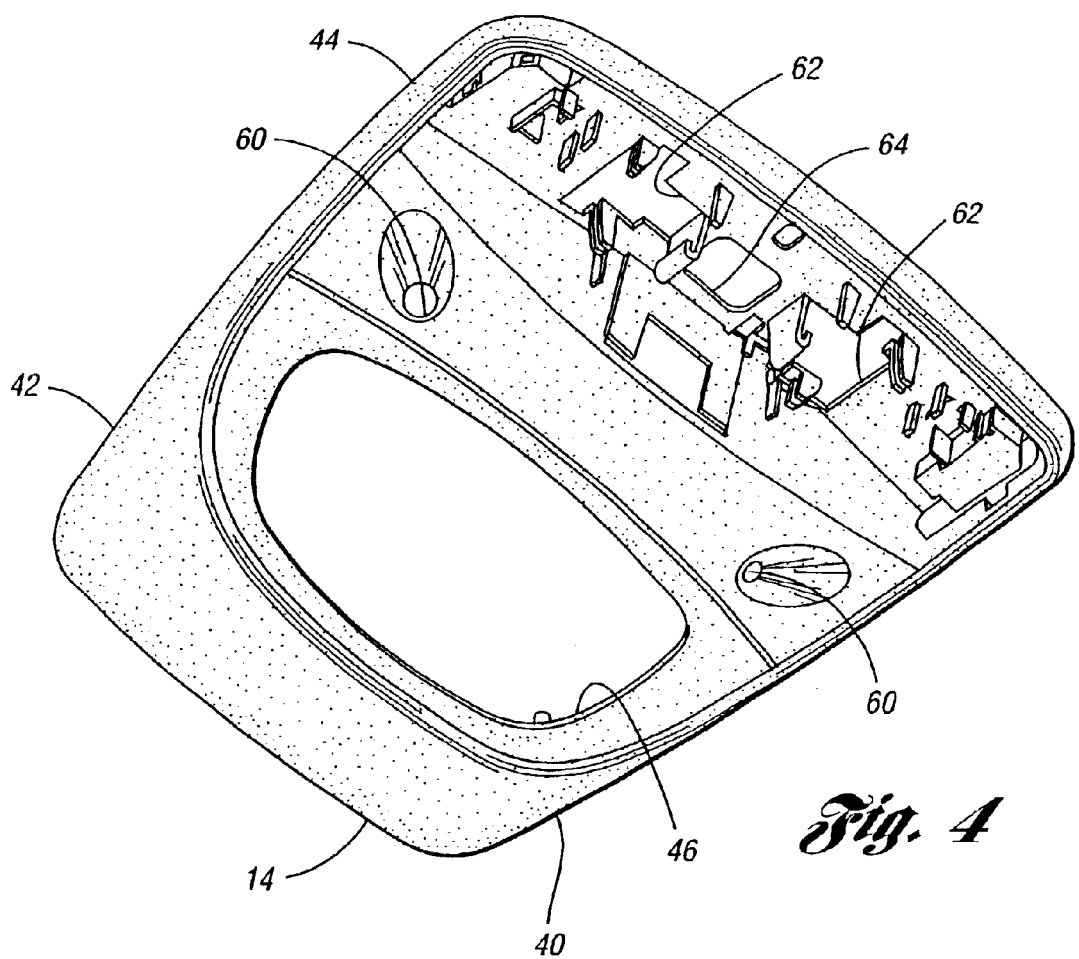
FIG. 4 is a bottom perspective view of the console housing as viewable from an interior passenger compartment of the vehicle.
Figure 5:
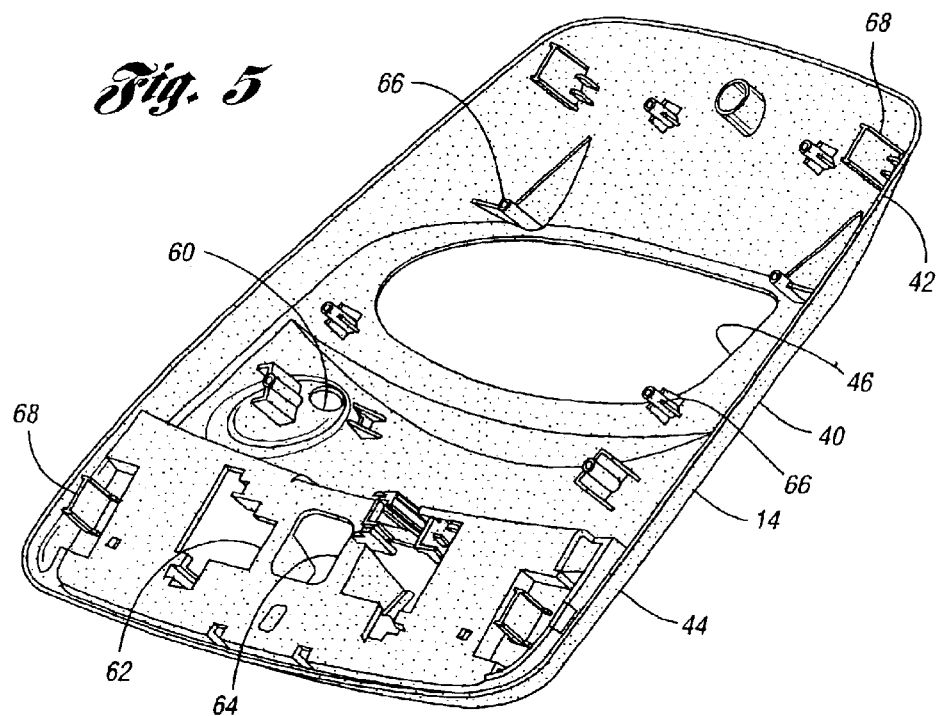
FIG. 5 is a top perspective view of the console housing.

FIGS. 4 and 5 show additional views of the bezel 40. As shown in these figures, the bezel 40 may include additional apertures 60–64 for receiving additional components, such as light bulbs, lenses, sensors and/or additional buttons. The bezel 40 may also include fastening element receptacles 66 for receiving screws 54 (shown in FIG. 3), or other fastening elements, that may be used to attach the CMTC module 12 to the bezel 40. In the embodiment shown in FIG. 5, the bezel 40 further includes snap fit fastening elements 68 for securing the bezel 40 to the vehicle headliner and/or vehicle roof. Alternatively or supplementally, the bezel 40 may be secured to the vehicle headliner and/or vehicle roof in any suitable manner, such as with screws or other fastening elements.

Figure 6:
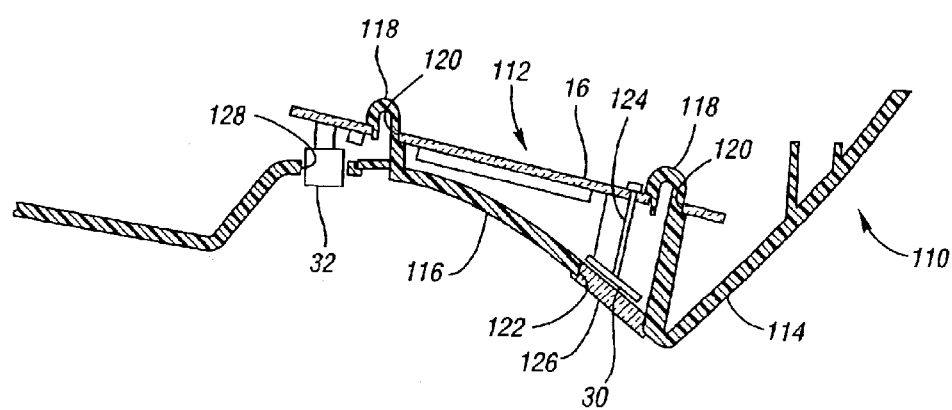
FIG. 6 is a cross-sectional view of a second embodiment of the console assembly including an electronic module attached to a console housing.

FIG. 6 shows a second embodiment 110 of a console assembly according to the invention. The assembly 110 includes an electronic module, such as a compass and mini trip computer (CMTC) module 112, connected to an overhead console 114. The CMTC module 112 includes similar features as the CMTC module 12, and the similar features are identified with the same reference numbers. The CMTC module 112, however, is provided without a face plate. In this embodiment, PCB 16 is attached directly to console housing or bezel 116 of the console 114 such that the bezel 116 substantially covers the PCB 16. For example, the bezel 116 may include one or more integral fastening elements, such as flexible z-clips 118, that are insertable into corresponding apertures 120 of the PCB 16, and engageable with the PCB 16 to secure the PCB 16 to the bezel 116. Alternatively, the PCB 16 may be attached to the bezel 116 in any suitable manner, such as with screws or other fastening elements.

The bezel 116 also includes a viewing aperture 122 that is positioned adjacent the display device 30 of the CMTC module 112 when the CMTC module 112 is attached to the bezel 116. The CMTC module 112 may also include a positioning element, such as a riser or pin 124, for attaching the display device 30 to the PCB 16. Furthermore, the console 114 may include a transparent cover 126 that is snap fit, or otherwise positioned, in the viewing aperture 122. In addition, the bezel 116 may include one or more button openings 128 for receiving control buttons 32 of the CMTC module 112.

As with console assembly 10, a separate enclosure or casing for the PCB 16 is not required with the console assembly 110. In the embodiment shown in FIG. 6, for example, the PCB 16 is exposed directly to a vehicle headliner or vehicle roof when the console assembly 110 is installed in a vehicle.

FIG. 7 shows an alternative mounting arrangement or scheme for mounting the CMTC module 112 to the bezel 116. More specifically, the bezel 116 shown in FIG. 7 includes one or more integral fastening elements, such as flexible z-clips 118 and flexible fasteners or clips 130, for securing the PCB 16 to the bezel 116. The CMTC module 112 and/or the bezel 116 may also include one or more positioning elements such as pins 132 for positioning the PCB 16 with respect to the bezel 116. For example, the positioning pins 132 may be attached to the PCB 16 or integrally formed with the bezel 116.

In the embodiment shown in FIG. 7, cover 126 includes a recess 134 for receiving and positioning display device 30. Alternatively, the display device 30 may be oriented with respect to the cover 126 and/or aperture 122 in any suitable manner.

FIG. 8 shows another alternative mounting arrangement or scheme for mounting the CMTC module 112 to the bezel 116. The bezel 116 shown in FIG. 8 includes two flexible fastening elements 136 that are configured to allow two different installation positions or orientations for the PCB 16. The fastening elements 136 have similar features as the fastening elements 20 described above, and function in a similar manner. More specifically, the forward most fastening element 136 has two projections 138 that are selectively engageable with corresponding openings in the PCB 16 to enable the PCB 16 to be installed in a first or lower position, shown in solid lines, and a second or upper position, shown in phantom lines, in which the front end of the PCB 16 is rotated upwardly with respect to the lower position. The PCB 16 also has projections 26 that are each insertable into a corresponding aperture 140 in a respective fastening element 136. With such an arrangement, a desired angular orientation for the PCB 16 may be achieved when the console assembly 110 is mounted to any one of two different vehicle roof system configurations. For example, the PCB 16 may be mounted substantially flat, i.e., within plus or minus 10 degrees from a horizontal plane, when the console assembly 110 is mounted to any one of two different vehicle roof system configurations.

Alternatively, the fastening elements 136 may be configured to allow additional installation positions for the PCB 16. For example, the fastening elements 136 may be provided with additional projections 138 positioned at different heights.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, any of the features described above with respect to one embodiment may be incorporated into any of the other above described embodiments.

What is claimed is:

1. A console assembly for use with a vehicle, the console assembly comprising:
   a console housing that is attachable to the vehicle, the console housing having an aperture; and
   an electronic module attached to the console housing, the electronic module including a circuit board and a face plate having an integral fastening element that secures the circuit board to the face plate, the face plate having an appearance surface and being positioned proximate the aperture of the console housing such that the appearance surface is viewable from an interior passenger compartment of the vehicle when the console assembly is installed in the vehicle, wherein the fastening element is configured to selectively secure the circuit board in any one of multiple installation positions with respect to the face plate.

2. The console assembly of claim 1 wherein the circuit board has an opening, and the fastening element includes a projection that extends into the opening.

3. The console assembly of claim 1 wherein the fastening element has an aperture, and the circuit board has a projection that extends into the aperture of the fastening element.

4. The console assembly of claim 1 wherein the circuit board has an opening, and the fastening element has multiple projections that are selectively insertable into the opening.

5. The console assembly of claim 1 wherein the fastening element has multiple apertures, and the circuit board has a projection that is selectively insertable into the apertures of the fastening element.

6. The console assembly of claim 1 wherein the console housing has an integral fastening element for securing the face plate to the console housing.

7. The console assembly of claim 6 wherein the face plate has an aperture, and the console housing fastening element extends into the face plate aperture.

8. The console assembly of claim 1 wherein the face plate does not enclose the circuit board.

9. The console assembly of claim 1 wherein the circuit board is exposed to a roof or headliner of the vehicle when the console assembly is attached to the vehicle.

10. The console assembly of claim 1 wherein the fastening element comprises a flexible clip that engages a first end of the circuit board, and wherein the face plate includes an additional fastening element that defines a gap for receiving a second end of the circuit board.

11. The console assembly of claim 10 wherein the additional fastening element comprises first and second portions, the first portion including a positioning pin, and the second portion including a projection that extends above the positioning pin.

12. The console assembly of claim 1 wherein the circuit board includes a compass sensor for sensing orientation of the vehicle.

13. The console assembly of claim 1 wherein the circuit board includes a circuit board body and a protective coating applied on the circuit board body.

14. The console assembly of claim 1 wherein the electronic module includes a display device and a control button associated with the circuit board, and the face plate includes a viewing aperture disposed adjacent the display device and a button opening that receives the control button.

15. A console assembly for use with a vehicle, the console assembly comprising:
   a console housing that is attachable to the vehicle such that at least a portion of the console housing is viewable from an interior passenger compartment of the vehicle, the console housing having an integral fastening element; and
   an electronic module having a circuit board attached to the fastening element of the console housing;
   wherein the fastening element is configured to selectively secure the circuit board in any one of multiple installation positions with respect to the console housing.

16. The console assembly of claim 15 wherein the circuit board has an aperture, and the fastening element is inserted into the aperture.

17. The console assembly of claim 15 wherein the circuit board includes a compass sensor for sensing orientation of the vehicle.

18. The console assembly of claim 15 wherein the electronic module includes a display device and a control button associated with the circuit board, and the console housing includes an aperture disposed adjacent the display device and a button opening that receives the control button.

19. A console assembly for use with a vehicle, the console assembly comprising:

a console housing that is attachable to the vehicle, the console housing having an aperture; and an electronic module attached to the console housing, the electronic module including a circuit board and a face plate having an integral fastening element that secures the circuit board to the face plate, the face plate having an appearance surface and being positioned proximate the aperture of the console housing such that the appearance surface is viewable from an interior passenger compartment of the vehicle when the console assembly is installed in the vehicle, wherein the circuit board is exposed to a roof or headliner of the vehicle when the console assembly is attached to the vehicle.

20. A console assembly for use with a vehicle, the console assembly comprising:

a console housing that is attachable to the vehicle, the console housing having an aperture; and an electronic module attached to the console housing, the electronic module including a circuit board and a face plate having an integral fastening element that secures the circuit board to the face plate, the face plate having an appearance surface and being positioned proximate the aperture of the console housing such that the appearance surface is viewable from an interior passenger compartment of the vehicle when the console assembly is installed in the vehicle, wherein the fastening element comprises a flexible clip that engages a first end of the circuit board.

21. The console assembly of claim 20 wherein the face plate includes an additional fastening element that defines a gap for receiving a second end of the circuit board.

22. A console assembly for use with a vehicle, the console assembly comprising:

a console housing that is attachable to the vehicle such that at least a portion of the console housing is viewable from an interior passenger compartment of the vehicle, the console housing having an integral fastening element; and an electronic module having a circuit board attached to the fastening element of the console housing, wherein the circuit board is exposed to a roof or headliner of the vehicle when the console assembly is attached to the vehicle.

* * * * *